United States Patent [19]
Meltsch et al.

[11] Patent Number: 5,440,074
[45] Date of Patent: Aug. 8, 1995

[54] METHOD FOR PRODUCING A TIGHT TERMINATION AT THE END OF A SHRINKABLE CABLE SLEEVE AND A SEAL ELEMENT USED THEREWITH

[75] Inventors: Hans-Juergen Meltsch, Schwerte; Wolfgang Schulte, Hagen, both of Germany

[73] Assignee: RXS Schrumpftechnik-Garnituren GmbH, Hagen, Germany

[21] Appl. No.: 163,879

[22] Filed: Dec. 8, 1993

[30] Foreign Application Priority Data

Dec. 8, 1992 [DE] Germany .................. 42 41 304.4

[51] Int. Cl.⁶ .................. H02G 15/04; H01R 43/00
[52] U.S. Cl. .................. 174/88 R; 156/49; 156/85; 156/86; 174/77 R; 174/93; 174/DIG. 8
[58] Field of Search .............. 174/88 R, 77 R, 93, 174/DIG. 8; 156/85, 86, 49

[56] References Cited

U.S. PATENT DOCUMENTS

| | | | |
|---|---|---|---|
| 4,298,415 | 11/1981 | Nolf | 156/85 |
| 4,400,579 | 8/1983 | Nolf | 174/92 |
| 4,438,294 | 3/1984 | Meltsch et al. | 174/88 R |
| 4,590,328 | 5/1986 | Kunze | 174/88 R |
| 4,648,924 | 5/1987 | Nolf | 174/DIG. 8 |
| 4,680,065 | 7/1987 | Vansant et al. | 156/49 |
| 4,689,474 | 8/1987 | Overbergh et al. | 174/DIG. 8 |
| 4,734,543 | 3/1988 | Nolf | 174/88 R |
| 4,920,236 | 4/1990 | Makiyo et al. | 174/77 R |
| 5,278,355 | 1/1994 | Read et al. | 174/88 R |
| 5,317,797 | 6/1994 | Nolf et al. | 174/DIG. 8 |

FOREIGN PATENT DOCUMENTS

| | | |
|---|---|---|
| 3105471 | 9/1982 | Germany ............ 174/DIG. 8 |
| 3204866 | 8/1983 | Germany . |
| 2413623 | 8/1984 | Germany . |
| 8414101 | 9/1984 | Germany . |
| 2900518 | 10/1986 | Germany . |
| 3728638 | 3/1989 | Germany . |
| 3815027 | 11/1989 | Germany . |
| 2195840 | 4/1988 | United Kingdom . |

Primary Examiner—Morris H. Nimmo
Attorney, Agent, or Firm—Hill, Steadman & Simpson

[57] ABSTRACT

A method for producing a tight termination at an introduction region of a shrinkable cable sleeve characterized by positioning the seal element between the cables, said seal element having a material deformable by the application of heat so that upon heating of the cable sleeve, the sleeve shrinks onto the cables to extend tangentially therebetween and the seal element fills the spaces between the cables and the walls of the cable sleeve. The seal element may be secured either to the cable sleeve or to one of the cables or to both. The seal element preferably has a fixed part of metal and a sealable part which will deform with the application of heat.

40 Claims, 9 Drawing Sheets

METHOD FOR PRODUCING A TIGHT TERMINATION AT THE END OF A SHRINKABLE CABLE SLEEVE AND A SEAL ELEMENT USED THEREWITH

BACKGROUND OF THE INVENTION

The present invention is directed to a method for producing a tight termination at an introduction region of a cable sleeve containing at least two cables and whose sleeve wall is shrinkable at least in the introduction region to produce a termination with the assistance of a sealing part of a seal element that is introduced between the cables and is at least partially composed of a heat-deformable material.

U.S. Pat. Nos. 4,400,579; 4,648,924 and 4,734,543, which are all based on the same British Reference as German Patent 29 00 518, all disclose a method for forming a tight connection between a heat shrinkable sleeve and at least two longitudinal elongated substrates or cables, wherein the sleeve largely presses against the surface of the cables between the two cables in an entry region of the cables into the sleeve. This means that a pressing mechanism must be provided in the entry region of the sleeve in order to make the close fit of the sleeve possible in the region between the two cables or substrates. This occurs with the assistance of a clamp through which the channels for the acceptance of the substrates or cables are formed. Respective legs of the clamp lie on the outside sections of the sleeve allocated to one another and, as a result thereof, constrictions of the sleeve are produced, so to speak, between the substrates or cables. Problems during shrinking can occur in these constrictions between the substrates under certain circumstances when heat is non-uniformly applied, particularly, for example, given cables or substrates having extremely different diameters.

German Patent 24 13 623 discloses an X-shaped termination member for sealing the gore regions or spaces in a cable sleeve. The seals in the gore region or the space between the cables being undertaken with these particular inserts. Pressing devices are likewise required here with which the envelope is pressed wave-shaped onto the terminating member lying therebetween so that a type of constriction also occurs here in every gore region. The pressing device, in turn, has legs that lie on the outside lying opposite one another and in the valleys of the envelope formed by the termination member and, thus, press the envelope together wave-like dependent on the termination member. Moreover, these pressing devices are replaced by U-shaped clamps after the shrinking and, likewise, lie against the outside of the envelope and securing the latter in position.

SUMMARY OF THE INVENTION

An object of the present invention is to create a method for producing a tight termination in a cable sleeve having more than one cable introduction per introduction region, wherein the respective introduction region can be executed in a surveyable, optimally smooth and unproblematical shaping with employment of a simple seal element, wherein the seal element required for this purpose, as well as the termination produced therewith, are comprised by this object.

The stated object is then achieved with a first method of the species initially cited in that the cable sleeve has its shrinkable region loosely wrapped around the introduction region, in that the seal element is fixed on one side between the cables with a fixing part of the seal element engaged on a sleeve wall of the cable sleeve and that subsequently heat is applied onto the region of the termination and onto the seal element until the heat-deformable seal part of the seal element is deformed so that it fills out the gore region between the introduced cables and the sleeve walls of the cable sleeve that lie opposite one another and have maximally shrunken to a tangential path between the cables in a sealing fashion.

In the second method of the species initially cited, the stated object is also achieved in that the cable sleeve has its shrinkable region loosely wrapped around the introduction region and that the seal element has an outer fixing part of the seal element fixed between the cables to at least one of the cables and, subsequently, heat is applied onto the region of the termination and onto the seal element until the sealing part of the seal element arranged on an inner fixing part is deformed so that it will fill out the gore region between the introduced cables and the sleeve walls of the cable sleeve that lie opposite one another and have maximally shrunken down to a tangential course between the cables in a sealing fashion.

The stated object is also achieved by the creation of a seal element for the first method, wherein the seal element comprises an inner fixing part and an outer fixing part, in that the inner and the outer fixing pans are connected to one another at their ends that a longitudinally proceeding slot remains between the two fixing parts, wherein the nip of the slot corresponds to the thickness of the single sleeve wall of the cable sleeve, in that the seal element can be fixed onto the cable sleeve by introducing the sleeve wall into the slot and in that the inner fixing part comprises a sealing part composed of a material deformable under the application of heat.

For the implementation of the second method, the seal element is created in conformity with the object which is characterized in that, with reference to the cable sleeve, it comprises an inner fixing part and outer fixing part and that the inner fixing part and the outer fixing part are connected lying behind one another in introduction direction and in that the outer fixing part can be fixed to at least one of the introduction cables with a fixing means and in that the inner fixing part comprises a seal part composed of a material deformable under the application of heat.

Finally, the stated object is additionally achieved by a termination in the introduction region that is produced according to one of the methods upon employment of a corresponding seal element and that the seal element is formed by reshaping the sealing part contained in the seal element and formed of heat-deformable material during the shrinking process so that the course of the sleeve wall of the cable sleeve in the gore region between the two cables is, respectively, at most, tangential and in that the fixing part of the seal elements are arranged at one of the seal walls in the introduction region and/or at least one of the introduced cables.

The goal of the invention is that the profilings, constrictions and the like disclosed in the prior art can be avoided in the introduction region of the cable sleeve having a plurality of cable introductions on the basis of the optimally simple shaping, as a result whereof the introduction region can be respectively considerably more reliably shaped. According to the invention, a formation of channels, waves or folds is no longer required for the introduction region having a plurality of cables of a cable sleeve, since these could lead to irregularities given incautious heat treatment. Given the introduction regions of the invention, the cable sleeve is, therefore, no longer contracted between the introduced cables, but is now maximally shrunken to a tangential path between the cables. Expressed in other words, the sleeve wall between the two cables respectively forms the course of a common tangent so that no inwardly shaped portion of the cable sleeve walls are formed at the end of the shrinking process, since they are neither drawn inward nor pressed together from the outside. A seal element that is composed of a sealing part and of a fixing part is employed for the sealing of the gore region between the cables and the respective tangential course of the sleeve wall. The seal element is at least partially composed of a meltable material, for example of a known hot-melt adhesive, that, given the application of heat, which also causes the shrinking of the cable sleeve, are deformed such that the material melts and fills the gore region in sealing fashion on the basis of reshaping. Deformation thereby occurs due to the shrinking cable sleeve, which is maximally shrunken taut up to the tangential course of its walls between the cables. The sealing part of the seal element is fixed between the cables in a suitable way without the shrinking cable sleeve being performed by the seal element. The sealing part is connected to the correspondingly shaped fixing part that is either plugged onto the wall part of the cable sleeve between the cables at one side or is at least secured to one of the introduction cables. The fundamental position of the seal element is thereby prescribed without a deformation of the as yet unshrunken cable sleeve thereby occurring.

The length of the inner fixing or, respectively, sealing parts is respectively optimum when it approximately corresponds to the diameter of the introduced cable; due, however, to the possibility of the emergence of excess material at the end face deviating up to 50% as definitely justifiable.

In one exemplary embodiment of the seal element of the invention, for example, at least the inner fixing part can be composed of a bimetallic fitting, or shaped part, which produces a desired modification of shape given the application of heat.

The inner fixing part can also be provided with an indicator means for temperature, so that the point in time for ending the application of heat can, thus, be recognized.

Other advantages and features of the invention will be readily apparent from the following description of the preferred embodiments, the drawings and claims.

DESCRIPTION OF THE PREFERRED EMBODIMENTS

Figure 1:
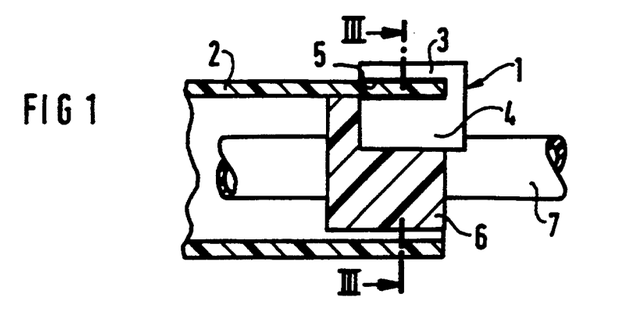
FIG. 1 is a longitudinal cross sectional view with portions in elevation of the positioning of a seal element in accordance with the present invention before shrinkage of the cable sleeve.

The principles of the present invention are particularly useful when incorporated in a sealing element, generally indicated at 1 in FIG. 1. The sealing element 1 is introduced into an introduction region of a cable sleeve 2 for producing a tight termination according to the method of the present invention. The seal element 1 is composed of a thermally conductive fixing part 3, 4 and of a sealing part 6, wherein the sealing part is preferably composed of a meltable material, such as, for example, a hot melt adhesive. The fixing part 3, 4, by contrast, is composed of a heat-resistant material, preferably metal. In the simplest case, the fixing part 3, 4 has a U-shaped clip-like shape and contains a slot 5 extending in a longitudinal direction between the portion 3 and portion 4. The gap width of the slot 5 corresponds to the order of magnitude of the wall thickness of the cable sleeve 2 and forms means for fixing the element 1 to the cable sleeve 2.

Figure 3:
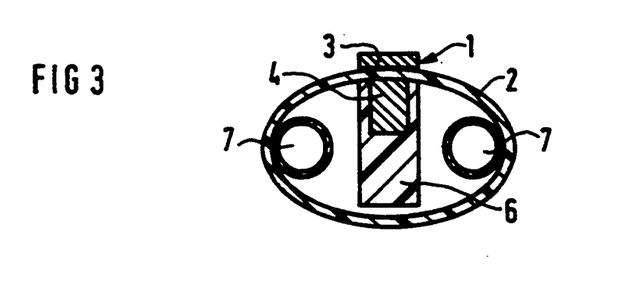
FIG. 3 is a cross sectional view taken along the lines III—III of FIG. 1.

After introduction of at least two cables 7, this cliplike fixing part 3, 4 is introduced between the cables 3 in the gore region formed together with the cable sleeve 2 so that a wall of the cable sleeve 2 is plugged up to the base of the slot 5 of the part 3, 4. As a result thereof, the introduction region is still completely loose, as best illustrated in FIG. 3. Shaping measures, such as constrictions or folding or fixing of the sleeve walls are, thus, not necessary. As shown in FIG. 1, it may be seen that the inwardly disposed fixing part 4 of the fixing part 3, 4 is the carrier of the sealing part 6 at the same time. The sealing part 6 is dimensioned so that in terms of the quantity of meltable material that at least the gore region between the cables 7 and the sleeve wall that maximally proceed tangentially between the cables 7 is filled out in a sealing fashion, and this maximally tangential course of the seal wall of the cable sleeve 1 in the gore region forms by itself during shrinking when care is not exercised to see that the emergence of the molten sealing material of the part 6 on the face end is prevented. Otherwise, the sealing part 6 is deformed until the gore region is completely tightly molded. An emergence of excess material of the sealing part at the end face is thereby also possible. As a result thereof, no clamp elements or clamping workpieces are required in the introduction region, and the constrictions or, respectively, compressions of the cable sleeve 2 between the cables 7, at least during the shrinking process, is not required. The cable sleeve 2 has a smooth, uniform surface so that no warping or irregularities can occur in this introduction region which would lead to difficulties with respect to tightness.

Figure 2:
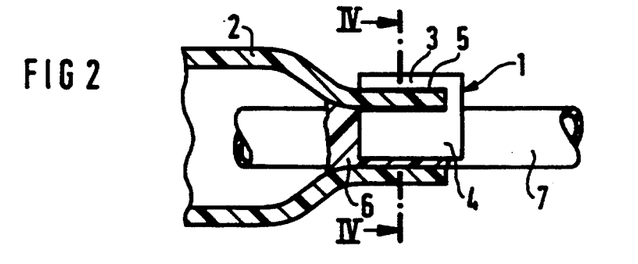
FIG. 2 is a longitudinal cross sectional view of the device of FIG. 1 after the shrinking has occurred.

After the shrinking process, it may be seen in FIG. 2 that the seal part 6 has been reshaped and that a tight termination in the introduction region has thereby been created in the entire gore region between the cables 7 and the sleeve wall of the sleeve 2. The fixing part 3, 4 of the seal region thereby remains unmodified and the walls of the cable sleeve 2 have shrunken onto the cable cladding up to a tangential course between the cable sleeves, as best illustrated in FIG. 4.

As can easily be seen in FIG. 3, the cable sleeve 2 is still loosely placed around the cables 7. This can thereby be a matter of a tubular cable sleeve or a cable collar having a longitudinal closure of shrinkable material, which is not shown in the drawings. It may be seen that the seal element 1, together with its fixing parts 3, 4, has merely been slipped onto the sleeve wall of the cable sleeve 2 so that the outer fixing part 3 presses against the outside and the inner fixing part 4 of the seal element presses against the inside of the cable sleeve. The inner fixing part 4 is surrounded by the actual sealing material of the sealing part 6.

Figure 4:
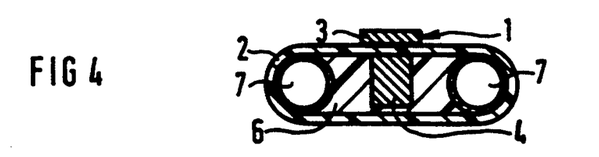
FIG. 4 is a cross sectional view taken along the lines IV—IV of FIG. 2.

As shown in FIG. 4, after the shrinking operation, the cable sleeve 2 has maximally shrunken to the tangential path or course between the enclosed cables 7. The core region is completely filled up with the deformable sealing material of the part 6 and forms the tight termination in the introduction region between the introduction cable 7 and the tangentially proceeding sleeve walls of the cable sleeve 2. A let-in portion, constriction or wave-shaped bent portions of the sleeve wall parts of the cable sleeve 2 between the cables 7 has not occurred in the gore region, so that the risk of jeopardizing deformation is no longer present at this introduction region.

Figure 5:
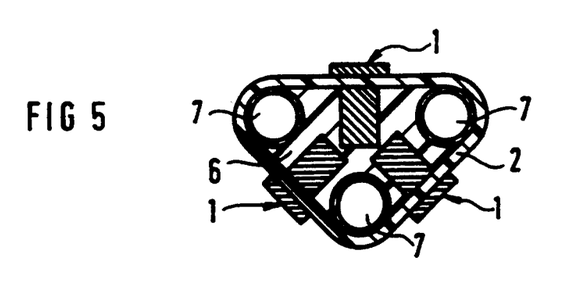
FIG. 5 is a cross sectional view similar to FIG. 4 showing a triple introduction into the cable sleeve.

If three cables 7 are to be introduced into the sleeve, then three seal elements 1 can be introduced between adjacent cables, with one between each pair of adjacent cable, so that after shrinking, the arrangement of FIG. 5 will be obtained. As illustrated, the cables are arranged in a triangular position and the three seal elements are introduced lying therebetween, and these seal parts 6 will melt together to form a single tight termination. Here, too, the course of the cable walls of the cable sleeve between the individual cables 7 is, respectively, tangential. Indentations or wave-shapes, drawn-in courses of the cable sleeve walls are likewise not produced, since the contraction due to the seal elements has not occurred. A triple or multiple introduction of the cables, however, can also be produced by cables 7 introduced in parallel, wherein one seal element must then be introduced between, respectively, two neighboring cables.

Figure 6:
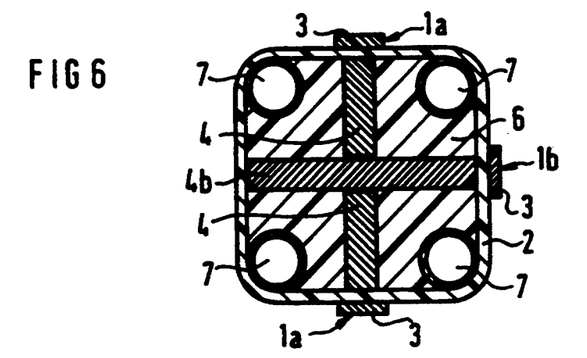
FIG. 6 is a cross sectional view similar to FIG. 4 showing a quadruple introduction with the assistance of two different sealing elements.

FIG. 6 shows a quadruple introduction of cables 7, wherein the cables are arranged in the corners of a quadrilateral shape. The inner space which occurs is prepared with the assistance of one long seal element and two short seal elements in a way set forth wherein the long seal element 1b has its inner fixing part 4b extending transversely through the interspace between the four cables with two cables on one side and two cables on the other side. The seal parts of the two short seal elements 1a, together with, respectively, one-half of the sealing part 6 of the long seal 1b, form a tight termination in each of the two half-spaces. Here, the course of the shrunken sleeve wall between, respectively, two cables is also tangential.

Figure 7:
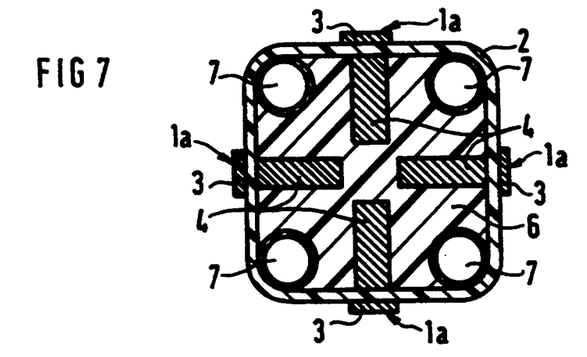
FIG. 7 is a cross sectional view similar to FIG. 6 showing an introduction utilizing four identical sealing elements.

Instead of utilizing one seal element having a long member 4b and two elements having short members 4, the arrangement of FIG. 7 can be used, wherein four identical seal elements 1a, wherein the inwardly directed pans 4, the seal elements 1a, respectively, extend not entirely up to the middle of the tight termination. The sealing parts 6 are deformed during shrinkage that the entire gore region is filled with the sealing fashion. In this, as well as in the preceding exemplary embodiment, it is indicated that the fixing part 3 lying against the sleeve wall of the cable sleeve 2 on the outside is respectively fashioned broader than the inwardly disposed fixing part 4, as a result whereof the absorption and, thus, the delivery of the heat into the interior is promoted.

Figure 8:
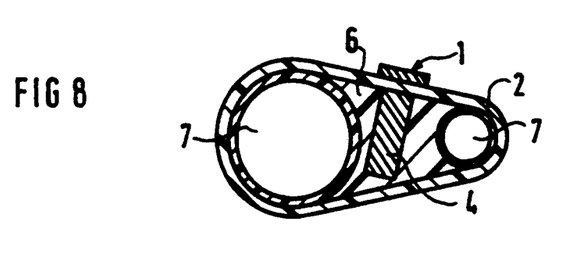
FIG. 8 is a cross sectional view similar to FIG. 6 showing a cable introduction having cables with different diameters.

FIG. 8 illustrates an arrangement of the cables 7 at a cable introduction, wherein the diameters of the cables 7 are different. The obliquely dropping-off form of the sleeve wall will occur in the introduction region of the cable sleeve 2; however, a maximum tangential course of the cable sleeve wall between the individual cables 7 is also, again, created in turn. The seal element 1, that is again fixed on only one sleeve wall here, has its inner fixing part 4, again, projecting into the inside of the gore region wherein the sealing part 6 has already been reshaped to form the tight enclosure.

Figure 9:
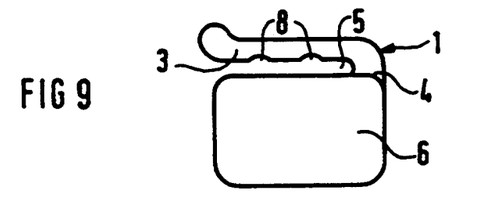
FIG. 9 is a side view of a rigid seal element in accordance with the present invention.

In an embodiment as illustrated in FIG. 9, the outer fixing part 3 has its free end bent up so that it can be slipped onto the sleeve wall better. Moreover, two notches or transverse riflings or grooves 8 may be seen, and these prevent the seal element 1 from sliding off the end of the sleeve. As a result thereof, less pressure is exerted in these notch regions and, moreover, a thicker layer of hot-melt adhesive respectively occurs on the inside of the sleeve wall, so to speak as a glue reservoir. This forms a better sealing barrier in the glue regions that have been thinned by the pressure of the seal element. The inner fixing part 4 of the seal element 1 is provided with the actual sealing part 6 in the form of a sealant that melts given the application of heat.

Figure 10:
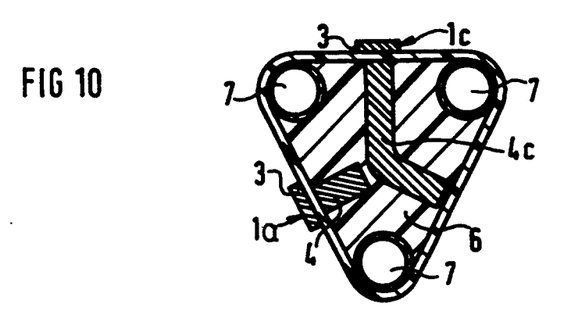
FIG. 10 is a cross sectional view similar to FIG. 5 showing a triple introduction with two different types of seal elements.

A version of the triple introduction of cables 7 is illustrated in FIG. 10. Here, a normal seal element 1a having a short inner fixing part 4 is used, and this extends approximately up to the middle of the termination. A fixing part 4c of a second seal element 1c is fashioned longer and is in an angled-off or bent condition. This element 1c is introduced so that a distribution of the seal material 6 into the two gore regions can thereby occur. The outer fixing parts 3 are, again, thickened, for example rounded off, to avoid injury.

Figure 11:
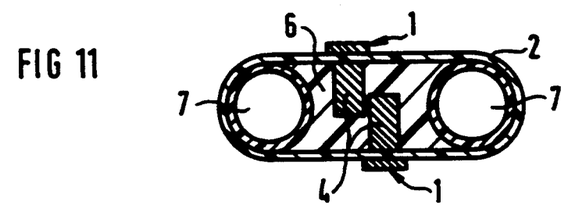
FIG. 11 is a cross sectional view similar to FIG. 6, wherein two seal elements were utilized in extending parallel to one another.

More than one seal element 1 can be introduced as needed in the gore region between the cables 7 and the sleeve walls, as illustrated in FIG. 11. Thus, it is expedient, but not compulsory, that only one respective seal element is slipped onto the sleeve. Here, the maximally tangential course of the sleeve walls of the cable sleeve 2 occurs between the cable 7 after the shrinking process, since the seal element 1 also does not provide any contraction of the sleeve wall here. Such an arrangement is expedient, for example, when the cables 7 lie at a greater distance from one another and when the sealing part 6 of the single seal element 1 could then potentially be too narrowly dimensioned.

Figure 12:
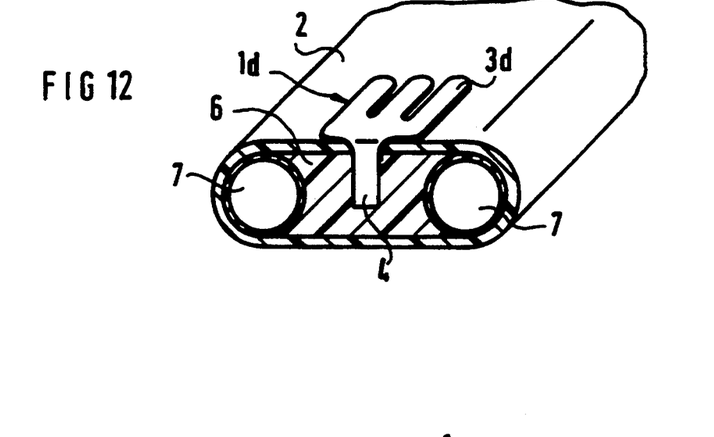
FIG. 12 shows a seal element having an outer three-finger fixing part.

A seal element 1d is illustrated in FIG. 12 and has an outwardly disposed fixing part 3d which is fashioned in a multi-finger form. The stability of the fixing is thereby enhanced and the sleeve wall that is clamped is also more uniformly heated during the shrinking process.

Figure 13:
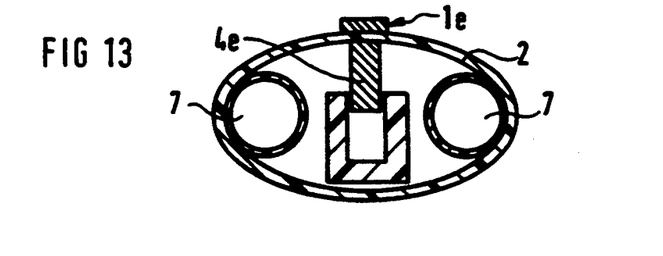
FIG. 13 is across sectional view similar to FIG. 5 before shrinking showing a seal part having a displaceable telescope-like arrangement.

In FIG. 13, a seal element 1e is illustrated and has an inner fixing part 4e which is adjustable so that it can have the extent of its depth matched to the height of the gore region. Here, for example, a telescope-like embodiment is selected and the inner fixing part 4e is initially extremely long, for example the situation can be such that the cable sleeve walls of the cable sleeve 2 are spread in the gore region. Given the application of heat, the interlock of the telescope-like structure is released and the inner fixing part 4e becomes shorter overall and, thus, presses especially well against the ultimate width of the gore region. The movable telescoping part also carries the sealing part 6 in the form of a material that can be reshaped given the application of heat.

Figure 14:
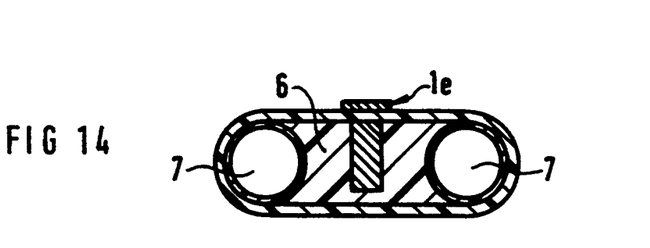
FIG. 14 is a cross sectional view of the embodiment of FIG. 13 after shrinking.

As illustrated in FIG. 14, the seal element is constructed telescope-like and a maximum tangential course of the cable sleeve 2, again, occurs between the cables 7 in the introduction region of the cable sleeve 2. Thus, the reshaped sealing part 6 will fill the gore region in a sealing fashion.

Figure 15:
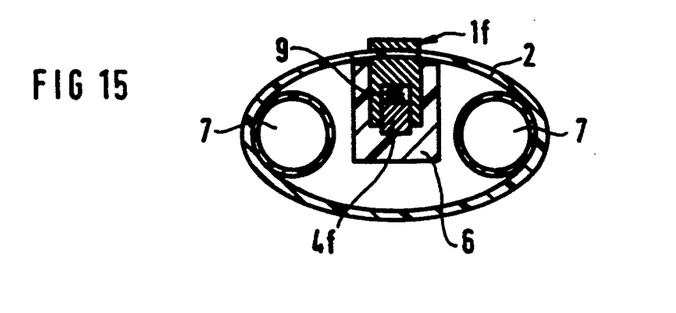
FIG. 15 is a cross sectional view prior to assembly of a second exemplary embodiment of a seal element provided with a spreading arrangement.

An exemplary embodiment of the seal element 1f is illustrated in FIG. 15 and has an inner fixing part 4f that will vary given an application of heat. Here, a compression spring element 9 is inserted in the inner fixing part 4f, and this is held, for example, in its compressed condition when delivered. Given the application of heat, the interlock, for example a hot-melt glue, is released and the inner fixing part 4f spreads open due to the spring power of the compression spring 9. This additionally contributes to the distribution of the molten sealing part 6 in the gore region.

Figure 16:
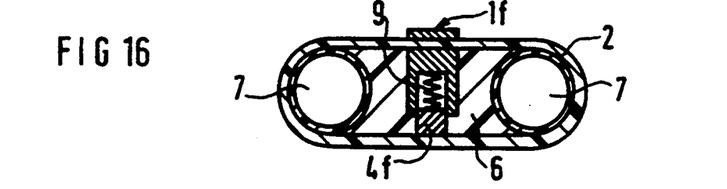
FIG. 16 is the embodiment of FIG. 15 after shrinking.

As illustrated in FIG. 16, the movable fixing part 4f has been driven outward by the compression spring 9 during the shrinking process. The movable fixing part will displace a volume of corresponding sealant in the gore region and, thus, contributes to an improved distribution thereof.

Figure 17:
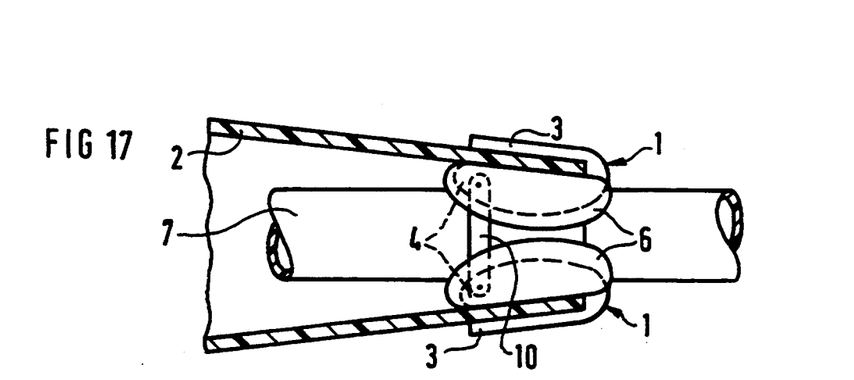
FIG. 17 is a longitudinal cross sectional view prior to shrinking of an end of a cable sleeve having two seal elements which are movably connected by a web.

In FIG. 17, an exemplary embodiment for the termination of the introduction region of a cable sleeve is illustrated, wherein two seal elements 1 of the type set forth above are movably independent of one another via a common web 10. Upon mounting of this combination, the web 10 is in the inside of the gore region and allows the position of the two seal elements to slip onto the sleeve wall of the cable sleeve to be adjusted nearly independent of one another. This facilitates mounting, particularly when the cable sleeve 2 has a conical taper, as shown in the Figure. In this way, the outer fixing part 3 of the seal element 1 comes to lie at the outside of the sleeve wall lying opposite one another, whereby the mobility of the seal elements 2 here also produce a maximally tangential course of the sleeve walls in the gore region. The inner fixing parts 4 each respectively carry the sealing parts 6 of an adequate quantity of meltable material.

Figure 18:
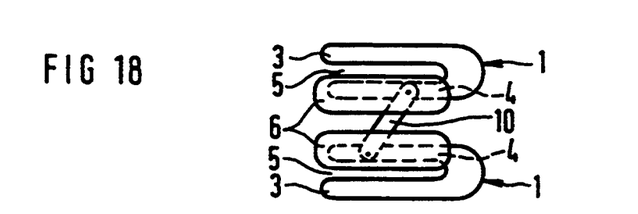
FIG. 18 is a side view of a modification of the seal element employed in FIG. 17.

FIG. 18 shows a seal element composed of two seal elements 1, similar to that utilized in the embodiment of FIG. 17. These two seal elements 1 are movably connected to one another by a web 10. The inner fixing parts 4 are each respectively provided with the sealing parts 6 of heat-deformable material. Upon mounting, the outer fixing parts 3 lie outside the tight termination of the cable sleeve walls, without indented portion or inwardly directed deformations occurring.

Figure 19:
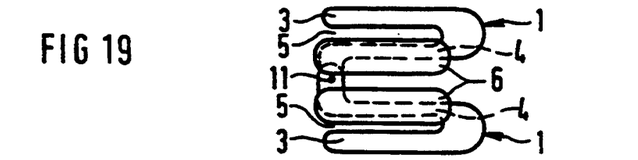
FIG. 19 is a side view of two seal elements connected to one another by a pivot or articulation.

FIG. 19, likewise, shows an exemplary embodiment of a combined sealing element having two individual seal elements 1 held in mobile fashion relative to one another. Here, the two seal elements 1 are connected to one another by an articulation or pivot 11. The inner fixing part 4 is provided with a meltable sealing part 6 of deformable material for each of the two seals.

Figure 20:
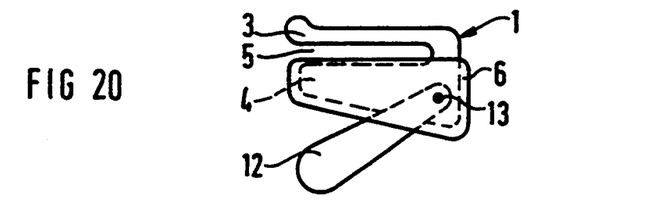
FIG. 20 is a side view of a modification of a seal element having a movable element.

Another version of the seal element 1 is illustrated in FIG. 20 and has a movable fixing and sealing part 12 that is movably arranged via an articulation or pivot 13 to the inner fixing part 4 of the seal element 1. This arrangement has the advantage that the overall width of the sealing parts 6 and 12 can be adapted during the shrinking to conform to the shaping of the gore region, first due to the angling of the mobile sealing part 12 and, second, due to the deformable sealing material of the sealing parts 6.

Figure 21:
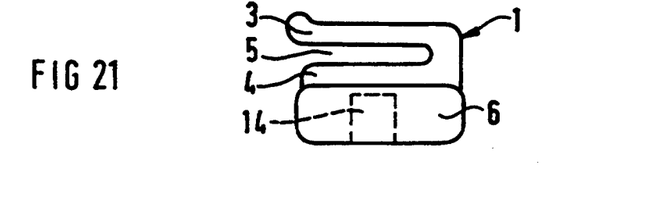
FIG. 21 is a side view of a seal element wherein the seal parts can be spread.

In FIG. 21, another embodiment of the seal element, wherein the sealing part 6 enlarges during heating, for example, as in the exemplary embodiment of FIGS. 15 and 16. In this arrangement, an element 14 can shift relative to the base 4.

Figure 22:
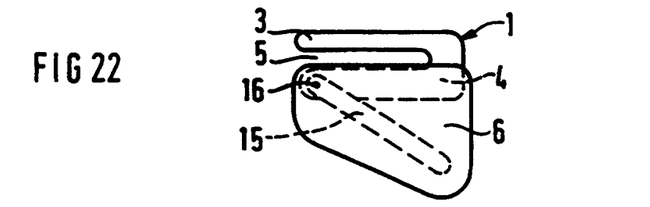
FIG. 22 is another side view of a further exemplary embodiment of the seal element having an additional movable sealing part.

A seal element having a movable part similar to that of FIG. 20, is illustrated in FIG. 22, wherein an articulation 16 is utilized for the mobility of an additional fixing and sealing part 15 which is arranged at the free end of the inner fixing part 4. For example, the seal part 6 can also extend over the fixing pan 4 and over the additional fixing part 15, wherein the mobility is then frozen in at normal temperatures. Due to the additional incorporation of spring elements, the desired direction of movement of the mobile sealing part 15 can be additionally promoted, for example a spreading or a retraction. The effect of the spring element can, likewise, be frozen in by the material of the sealing part 6.

Figure 23:
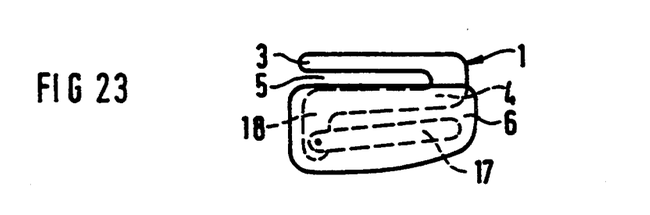
FIG. 23 is a side view of yet another exemplary embodiment having additional movable sealing parts.

Proceeding from the exemplary embodiment of FIG. 22, the inner fixing part 4 of the seal element in the exemplary embodiment of FIG. 23 additionally has a vertically angled portion or nose 18 so that it can already by employed for relatively wide gore regions in its original condition. The movable part 17 serves the purpose of further adaptation of the sealing regions of the termination. The other conditions, such as the presence of a spring, have already been described.

Figure 24:
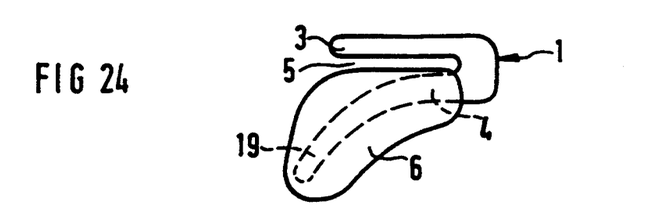
FIG. 24 is a side view of a seal element having a shape of a figure seven.

In the exemplary embodiment of FIG. 24, the inner fixing part 4 of the seal element 1 is provided with a continuation 19 that can be fashioned either rigid, resilient or plastically deformable. Such a seal element can be employed in the same way as set forth above.

Figure 25:
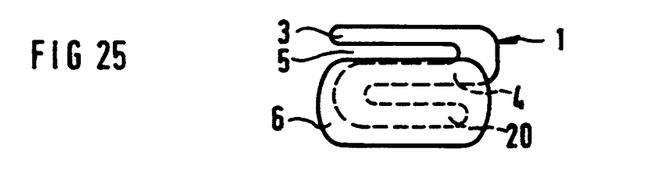
FIG. 25 is a side view of a seal element having an S shape.

In FIG. 25, an element 1 having an S shape, whereby the inner S shape projection 20 can again be rigid, resilient or plastically deformable.

Figure 26:
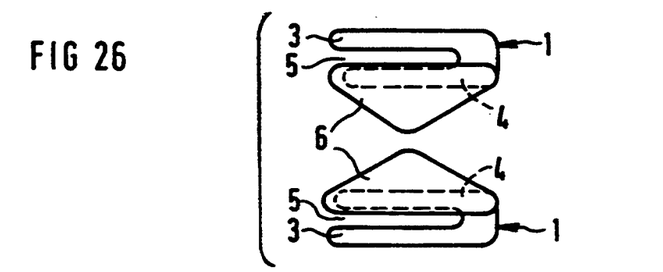
FIG. 26 is a side view of two seal elements placed side-by-side and having a triangular sealing part.

To form a tight termination with the assistance of two identically constructed seal elements 1, an arrangement of elements 1 is shown in FIG. 26. Here, the two elements are respectively composed of fixing pans 3-4, as already mentioned. The inner fixing part not visible respectively carries the seal part 6 that has a triangular shape and are each respectively mounted on a sleeve wall by being introduced with the points directed toward one another. During the shrinking process, the sealing parts 6 are deformed and move toward one another and fuse to form a tight termination. The course of the sleeve walls between the individual cables is again, at most, tangential.

Figure 27:
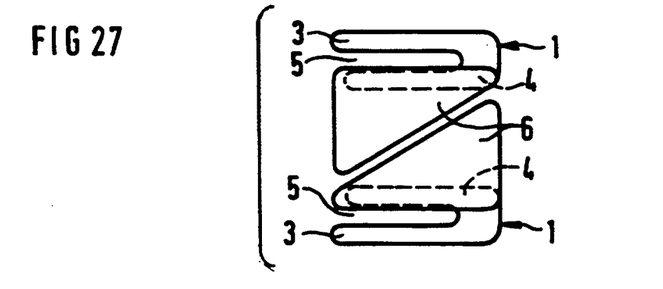
FIG. 27 is a side view of two sealing elements placed side-by-side and having mating triangular sealing parts.

In FIG. 27, an arrangement with two similar seal parts is illustrated, wherein the sealing part 6 has a triangular configuration. The two sealing pans supplement one another to form a block and fuse together during the shrinking process to form a tight termination.

Figure 28:
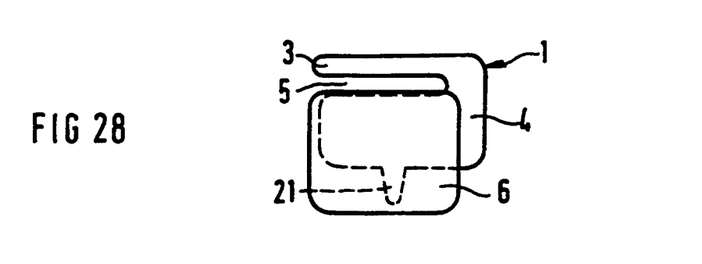
FIG. 28 is a side view of a seal element wherein the seal part comprises a spring-like projection.

Another embodiment of the seal element 1 is illustrated in FIG. 28 and shows an acute continuation 21 on the inner fixing part 4, which allows a change in shape and, thus, a shape matching. The entire inner structure can be coated with a sealing part 6 in the form of deformable material.

Figure 29:
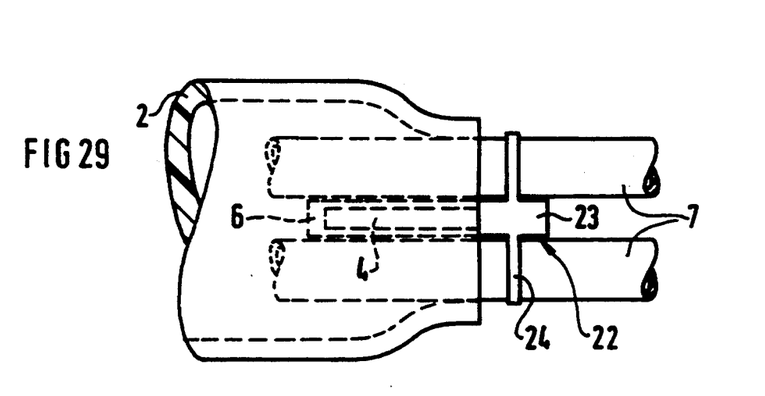
FIG. 29 is a plan view of a cable sleeve having a pair of cables introduced therein with a modification of a seal part.

In each of the preceding embodiments, the member 1 was attached to an edge of the sealing sleeve. Another embodiment is illustrated in FIG. 29, wherein a sealing element 22 is not physically attached to the cable sleeve, but is connected to at least one of the introduction cables 7 between which it is introduced. During mounting, the cable sleeve 2 is thus arranged completely freely around the introduction region and can be shrunk without impediment. During this process, the ultimate course of the cable sleeve walls of the cable sleeve 2 between the cable 7 can likewise, again, only be tangential at the most, whereas the sealing part 6 of the sealing element 22, which is fixed to the cable 7, is again deformed due to the shrinking cable sleeve 2 so that a tight termination occurs in the introduction region. The conditions of the sealing part 6 are absolutely comparable to those of the preceding exemplary embodiments. The sole difference lies in that the fixing part 23 proceeds in the same direction as the inner fixing part 4 coated with the sealing part 6 and that the appropriate fixing means 24, for example a strap retainer or similar mechanism, is arranged at the fixing part 23 for connecting the seal element to one or more of the cables. The seal element is then secured to at least one of the introduction cables 7 with these fixing means 24. The seal part 6 is likewise dimensioned so that in terms of quantity of sealant that the latter is adequate for a tight termination in any case.

Figure 30:
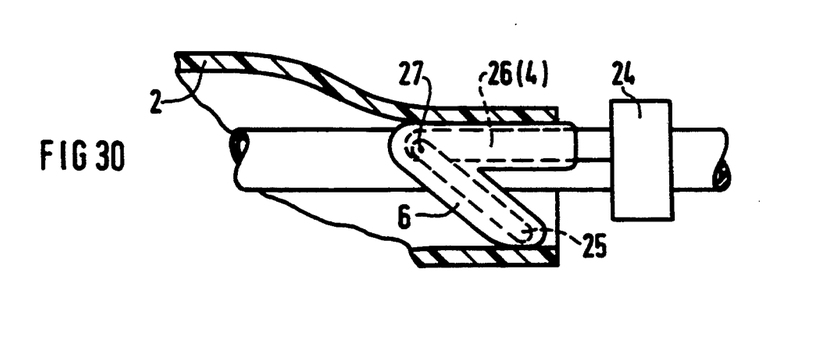
FIG. 30 is a longitudinal cross sectional view of a seal element if FIG. 29 likewise equipped with an auxiliary and having the arrangement as set forth hereinabove.

The inner portion 4 and the portion 6 can have the various arrangements previously described. An example is shown in FIG. 30 wherein an inner fixing part 26 has an additional movable fixing part 25 that is seated via an articulation 27 on the inner fixing part 26 of the seal element 22. Either separately or in common, the fixing parts 26 and 27 are coated or, respectively, surrounded with a sealing part 6 composed of appropriately deformable material. During shrinking of the cable sleeve 2, the mobile sealing part 25 is correspondingly pressed on and together with the fixing sealing part 26 and the seal part 6 to form an entire termination in the introduction region of the cable sleeve 2.

Figure 31:
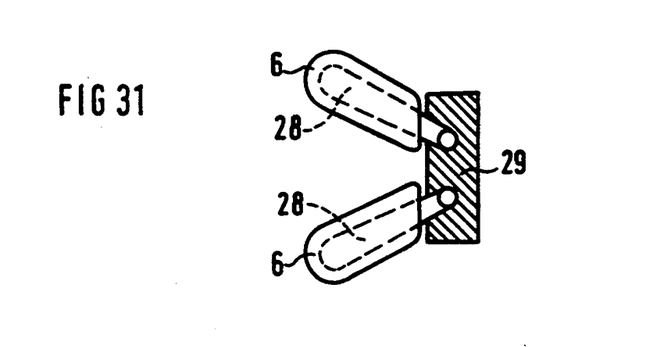
FIG. 31 is a partial cross sectional view of the seal element utilized in the arrangement of FIG. 29.

Two mobile sealing pans 28 can also be secured to a sealing part 29, as illustrated in FIG. 31. Matching in the introduction region can likewise be achieved in this way, since the two sealing parts 28, together with the deformable sealing parts 6, are pressed into their ultimate position by the shrinking cable sleeve 2.

Figure 32:
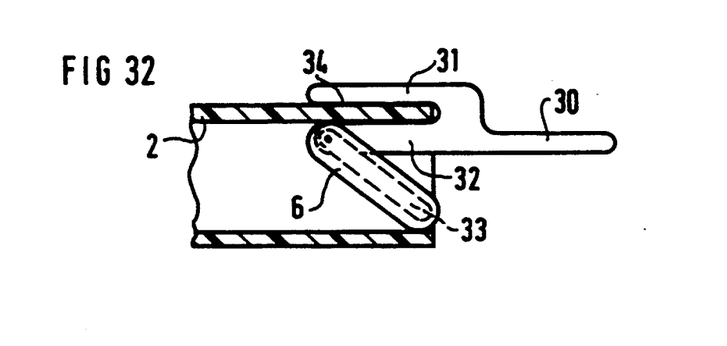
FIG. 32 is a cross sectional view with portions in elevation of a seal element usable in the arrangement of either FIG. 1 or FIG. 29.

In all of the previous embodiments, the sealing member or part was either connected to the cable sleeve or to the cables. In the embodiment illustrated in FIG. 32, parts 30, 31 are combined so that it can be fixed to both. Here, a fixing part 30 is continued farther in the longitudinal direction of the inner fixing part 32 so that it can be affixed to at least one of the cables. In addition, an outer fixing part 31 is also provided and coacts with the inner fixing part 32 to form a slot 34 for receiving the cable sleeve 2. In this way, two fixings can now be undertaken, one to the cable sleeve 2 and then to at least one of the cables that is being introduced. In addition, the arrangement is shown with a movable part 33 which receives the material or part 6.

Figure 33:
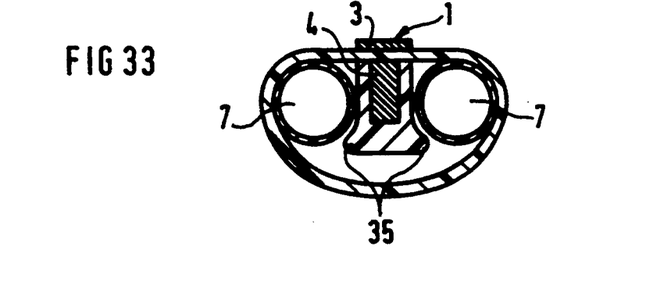
FIG. 33 is a cross sectional view of a sealing element having a molded or inner fixing part.

As illustrated in FIG. 33, the inner fixing pan 4, whether movable or not, comprises at least one shaped portion 35 at the free, lower end, and this shaped portion 35 is formed, for example, on both sides. What is hereby guaranteed is that the seal element 1 can no longer slip out of the interspace between the two cables after the introduction on the sleeve wall. Such formed portions can also be provided in all of the previous exemplary embodiments of the seal elements. A plurality of inner fixing parts that can also be movable, moreover, can be arranged on this outer fixing part.

Although various minor modifications may be suggested by those versed in the art, it should be understood that we wish to embody within the scope of the patent granted hereon all such modifications as reasonably and properly come within the scope of our contribution to the art.

We claim:

1. A method for producing a tight termination at an introduction region of a cable sleeve containing at least two cables with the assistance of a seal element introduced between the at least two cables, said cable sleeve having a sleeve wall which is shrinkable at least in the introduction region, said method comprising the steps of introducing at least two cables into the introduction region of the cable sleeve, positioning a seal element between the at least two cables, said seal element having a heat-deformable sealing part, selectively fixing said seal element to one side of said cable sleeve and between said at least two cables, then applying heat to cause the heat-deformable sealing part to deform to fill the gore region between the introduced cables and the sleeve wall of the cable sleeve and to shrink the sleeve wall maximally up to a tangential course between the at least two cables in a sealing fashion.

2. A method according to claim 1, wherein the step of selectively fixing the seal element fixes the seal element directly to the introduction region of said cable sleeve.

3. A method according to claim 2, wherein the seal element has an outer fixing pan and an inner fixing part separated by a slot, said step of fixing includes inserting an edge of the one side of the cable sleeve in said slot.

4. A method according to claim 1, wherein the step of inserting a seal element between the at least two cables includes inserting a plurality of seal elements extending parallel to each other between the at least two cables.

5. A method according to claim 1, wherein a plurality of seal elements lying parallel to one another are disposed between at least two cables, said step of fixing fixes the elements to the sleeve wall of the cable sleeve with adjacent elements connected to opposite portions of the sleeve wall.

6. A method according to claim 1, wherein the at least two cables are arranged in the introduction region to lie in one plane.

7. A method according to claim 1, wherein the step of introducing inserts cables having two different diameters.

8. A method according to claim 1, wherein the step of fixing the seal element fixes the seal element to at least one of the at least two cables in addition to one side of the cable sleeve.

9. A method according to claim 1, wherein the steps of introducing and positioning inserts three cables in the introduction region in a triangular form with three seal elements.

10. A method according to claim 1, wherein the steps of introducing and positioning inserts three cables in a triangular form in the introduction region with a short seal element and a long seal element, said long seal element having a bent inner part which extends between two gore regions of the three cables.

11. A method according to claim 1, wherein the steps of introducing and positioning inserts four cables in a quadrilateral form with four seal elements.

12. A method according to claim 1, wherein the steps of introducing and positioning inserts four cables in a quadrilateral form with a long seal element that separates two of the cables from the other two cables and two short seal elements.

13. A method according to claim 1, wherein the seal element has an enlarged inner fixing part with a meltable material secured thereon, and during heating said meltable material moves relative to said inner fixing part.

14. A method according to claim 1, wherein the seal element changes size to match the gore region during application of heat and shrinking of the sleeve.

15. A method according to claim 1, wherein the step of positioning the seal element positions two seal elements interconnected to one another via a link in mirror symmetry and movable relative to each other, said combined seal element being introduced into the gore region between the cables and each of the seal elements being individually fixed to the respective seal walls of the cable sleeve so that the seal elements adjust themselves relative to the sleeve walls in the gore region, respectively, as the shrinking of the walls tangentially to the cables occur.

16. A method according to claim 1, wherein the step of positioning the seal element introduces individual seal elements one above another, wherein only, respectively, one seal element is affixed at each sleeve wall of the cable sleeve.

17. A seal element for being arranged between cables positioned in an introduction region of a shrinkable cable sleeve for forming a tight termination therebetween with said cable sleeve extending tangentially relative to each of said cables, said seal element including an inner fixing part and an outer fixing part, said element having means for fixing the seal element selectively to one side of the cable sleeve, the inner fixing part including a sealing part composed of a material deformable upon the application of heat.

18. A seal element according to claim 17, wherein the outer fixing part and the inner fixing part are connected and spaced apart by a slot, said slot providing the means for fixing the seal element to the cable sleeve.

19. A seal element according to claim 18, wherein the outer fixing part is bent up at its free end.

20. A seal element according to claim 18, wherein the outer fixing part has transverse grooves for engaging the seal element in the slot.

21. A seal element according to claim 18, wherein the inner fixing part has a bent portion.

22. A seal element according to claim 18, wherein the outer fixing part is broader than the inner fixing part.

23. A seal element according to claim 18, wherein the heat-deformable sealing part is composed of a meltable material.

24. A seal element according to claim 18, wherein the inner and outer fixing parts are composed of a thermally-conductive material.

25. A seal element according to claim 18, wherein the inner fixing part can be pressed together given application of heat.

26. A seal element according to claim 18, wherein the inner fixing part has a movable member to spread apart during application of heat.

27. A seal element according to claim 18, wherein two seal elements are movably coupled together via a web.

28. A seal element according to claim 18, wherein two seal elements are movably coupled together via an articulation.

29. A seal element according to claim 18, which includes means for securing the seal element to at least one cable.

30. A seal element according to claim 18, which includes an additional fixing part attached to the inner fixing part and movable thereto during application of heat.

31. A seal element according to claim 18, wherein the inner fixing part comprises a right angle portion and a movable additional member secured to said right angle portion.

32. A seal element according to claim 18, wherein the inner fixing part is provided with a continuation composed of a deformable material upon the application of heat.

33. A seal element according to claim 18, wherein the inner fixing part has an extension so that the inner and outer fixing parts form an S shape.

34. A seal element according to claim 18, wherein the inner fixing part has a deformable, acute continuation.

35. A seal element according to claim 18, wherein the sealing part has a triangular configuration.

36. A seal element according to claim 17, wherein the applied sealing part to the inner fixing part has at least one laterally formed portion adjacent its free end.

37. A seal element according to claim 18, wherein the outer fixing part has a multi-finger configuration.

38. A seal element according to claim 18, wherein a plurality of inner movable fixing parts are arranged on the outer fixing part and each of said inner fixing parts has a sealing part secured thereto.

39. A termination of an introduction region of a shrinkable cable sleeve comprising at least two cables inserted through the introduction region, said cable sleeve wall extending tangentially relative to each of said cables to form a gore region, a sealing element being fixed to one side of said cable sleeve wall and being disposed in the gore region forming a seal with the wall of the cable sleeve and each of said cables.

40. A method for producing a tight termination at an introduction region of a cable sleeve containing at least two cables with the assistance of a sealing element introduced between the at least two cables, said cable sleeve having a sleeve wall which is shrinkable at least in the introduction region, said method comprising the steps of introducing at least two cables into the introduction region of the cable sleeve, positioning the sealing element between the at least two cables, the sealing element having a heat-deformable sealing part and an outer fixing part having a retaining strap, selectively fixing the sealing element to at least one of the at least two cables by engaging the at least one cable with said retaining strap so that the sealing element is free to move relative to the introduction region of said cable sleeve then applying heat to cause the heat-deformable sealing part to deform to fill the gore region between the introduced cables and the sleeve wall of the cable sleeve and to shrink the sleeve wall maximally up to a tangential course between the at least two cables in a sealing fashion.

* * * * *